(12) United States Patent
Saito

(10) Patent No.: US 11,496,665 B2
(45) Date of Patent: Nov. 8, 2022

(54) IMAGE CAPTURING APPARATUS AND CONTROL METHOD THEREOF

(71) Applicant: CANON KABUSHIKI KAISHA, Tokyo (JP)

(72) Inventor: Junichi Saito, Kanagawa (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 17/082,846

(22) Filed: Oct. 28, 2020

(65) Prior Publication Data

US 2021/0136295 A1 May 6, 2021

(30) Foreign Application Priority Data

Oct. 30, 2019 (JP) .............................. JP2019-197648

(51) Int. Cl.
*H04N 5/232* (2006.01)
*H04N 5/225* (2006.01)
*H04N 5/369* (2011.01)

(52) U.S. Cl.
CPC ..... *H04N 5/232122* (2018.08); *H04N 5/2253* (2013.01); *H04N 5/2254* (2013.01); *H04N 5/23254* (2013.01); *H04N 5/23258* (2013.01); *H04N 5/23287* (2013.01); *H04N 5/232121* (2018.08); *H04N 5/36961* (2018.08)

(58) Field of Classification Search
None
See application file for complete search history.

(56) References Cited

U.S. PATENT DOCUMENTS

| | | | |
|---|---|---|---|
| 2010/0079825 A1* | 4/2010 | Yamazaki | G06V 10/88 358/474 |
| 2013/0034345 A1* | 2/2013 | Miyahara | H04N 5/23258 396/55 |
| 2016/0006937 A1* | 1/2016 | Yamamoto | H04N 5/2253 348/208.11 |
| 2016/0094767 A1* | 3/2016 | Yamamoto | H04N 9/07 348/208.7 |
| 2016/0261800 A1* | 9/2016 | Miyagi | H04N 9/04557 |
| 2016/0269643 A1* | 9/2016 | Numako | G03B 5/00 |
| 2016/0316158 A1* | 10/2016 | Uchida | H04N 5/23245 |
| 2019/0007617 A1* | 1/2019 | Kitagawa | G06T 7/70 |
| 2021/0144291 A1* | 5/2021 | Akamatsu | G02B 7/36 |

FOREIGN PATENT DOCUMENTS

JP 2009-244862 A 10/2009
JP 2012-209968 A 10/2012

* cited by examiner

*Primary Examiner* — Twyler L Haskins
*Assistant Examiner* — Wesley J Chiu
(74) *Attorney, Agent, or Firm* — Cowan, Liebowitz & Latman, P.C.

(57) ABSTRACT

An image capturing apparatus comprises an image sensor in which a plurality of pixels are arranged, wherein the plurality of pixels output focus detection signals based on light flux that has passed through an imaging optical system, a shifting unit that shifts an incident position of the light flux on the image sensor; and a focus detection unit that performs focus detection using the focus detection signals. The shifting unit shifts the incident position by a predetermined distance which is equal to or less than a distance between the pixels of the image sensor corresponding to the focus detection signals during a charge accumulation period in the image sensor for acquiring the focus detection signals.

17 Claims, 7 Drawing Sheets

IMAGE CAPTURING APPARATUS AND CONTROL METHOD THEREOF

BACKGROUND OF THE INVENTION

Field of the Invention

The present invention relates to an image capturing apparatus and a control method thereof.

Description of the Related Art

Conventionally, there is known a technique for alleviating spatial aliasing by arranging an optical low-pass filter on an incident surface side of an image sensor such as a CCD and a CMOS sensor.

FIG. 8 is a diagram schematically showing a spatial frequency of an image generally acquired by an image sensor and its response characteristics. In FIG. 8, the horizontal axis represents the spatial frequency of the image when the sampling frequency (pixel interval) is 1, and the vertical axis represents the response. The solid line indicates the response characteristics of the image sensor with respect to the image obtained by the image sensor. Since the response characteristic shown here also includes the MTF characteristics as optical characteristics of the imaging optical system for forming an image with light from the subject on the image sensor, the response characteristics gradually decrease toward 1 which is the sampling frequency.

When the optical low-pass filter is not arranged, the low-pass filter effect can be obtained only by the pixel aperture and the photographing optical system, and the response becomes large even at a relatively high frequency such as a frequency $F_H$. It is known from the sampling theorem that the response at the frequency $F_H$ is folded back around the Nyquist frequency of 0.5 and is erroneously recognized as the response at a frequency $F_L$. If signals in a frequency band around the frequency $F_L$ are extracted when calculating the phase difference for focus detection, the influence of its spatial aliasing cannot be ignored, and in some cases, the obtained result of the focus detection may be largely erroneous. Therefore, conventionally, it is common to arrange the optical low-pass filter so that the response in the high frequency region higher than the Nyquist frequency is reduced as shown by the dotted line.

On the other hand, many image stabilization techniques in an image capturing apparatus such as a digital camera have been disclosed, in which an influence of shake applied to the apparatus is corrected by moving an image sensor such as a CMOS sensor or a part of optical elements forming an imaging optical system in a direction orthogonal to an optical axis.

Japanese Patent Laid-Open No. 2012-209968 discloses a technique regarding a vibration type low-pass filter capable of achieving an effect equivalent to an optical low-pass filter by driving the vibration type low-pass filter in a predetermined manner during image shooting by making use of a mechanism for the image stabilization technique. According to Japanese Patent Laid-Open No. 2012-209968, the resolution of image data to be obtained is adjusted by driving the vibration type low-pass filter by a minute amount of 0 to several pixels in the horizontal and vertical directions of an image sensor for at least two cycles during an exposure period. By such operation of the vibration type low-pass filter during the exposure period, it is possible to eliminate the influence of moire on the image to be captured, and an appropriate optical low-pass filter effect can be achieved.

The spatial aliasing of the high spatial frequency component of the subject adversely affects not only an image used for recording but also an image used for focus detection in the shooting preparation state. Therefore, even in focus detection processing of an on-imaging plane phase difference method that performs focus detection using phase difference information between signals obtained from focus detection pixels or of a contrast method that performs focus detection using a contrast evaluation result of a live view image, the effect of the vibration type low-pass filter can be obtained similarly.

However, the driving method described in Japanese Patent Laid-Open No. 2012-209968 has the following problems. The frame rate of images obtained for focus detection has been significantly increased in recent years in order to speed up focus detection, and it is necessary to raise the frequency of the vibration type low-pass filter according to the frame rate. Thus, as the focus detection cycle becomes shorter, the image sensor need to be reciprocated at higher speed. However, in the case of the vibration type low-pass filter that makes use of the image stabilization mechanism, there is a limit to increase the vibration frequency. In addition, the high-speed reciprocating operation of the image sensor may cause unpleasant sound and vibration, and in addition, depending on the frame rate, the reciprocating operation of the image sensor cannot respond to a certain band and the desired low-pass filter effect cannot be obtained.

SUMMARY OF THE INVENTION

The present invention has been made in consideration of the above situation, and obtains an appropriate low-pass filter effect by using an image stabilization mechanism even when a frame rate is high.

According to the present invention, provided is an image capturing apparatus comprising: an image sensor in which a plurality of pixels are arranged, wherein the plurality of pixels output focus detection signals based on light flux that has passed through an imaging optical system; a shifting unit that shifts an incident position of the light flux on the image sensor; and a focus detection unit that performs focus detection using the focus detection signals, wherein the shifting unit shifts the incident position by a predetermined distance which is equal to or less than a distance between the pixels of the image sensor corresponding to the focus detection signals during a charge accumulation period in the image sensor for acquiring the focus detection signals, and wherein each unit is implemented by one or more processors, circuitry or a combination thereof.

According to the present invention, provided is a control method of an image capturing apparatus which comprises an image sensor in which a plurality of pixels are arranged, wherein the plurality of pixels output focus detection signals based on light flux that has passed through an imaging optical system, a shifting unit that shifts an incident position of the light flux on the image sensor, and a focus detection unit that performs focus detection using the focus detection signals, wherein the shifting unit shifts the incident position by a predetermined distance which is equal to or less than a distance between the pixels of the image sensor corresponding to the focus detection signals during a charge accumulation period in the image sensor for acquiring the focus detection signals.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

DESCRIPTION OF THE EMBODIMENTS

Figure 1A:
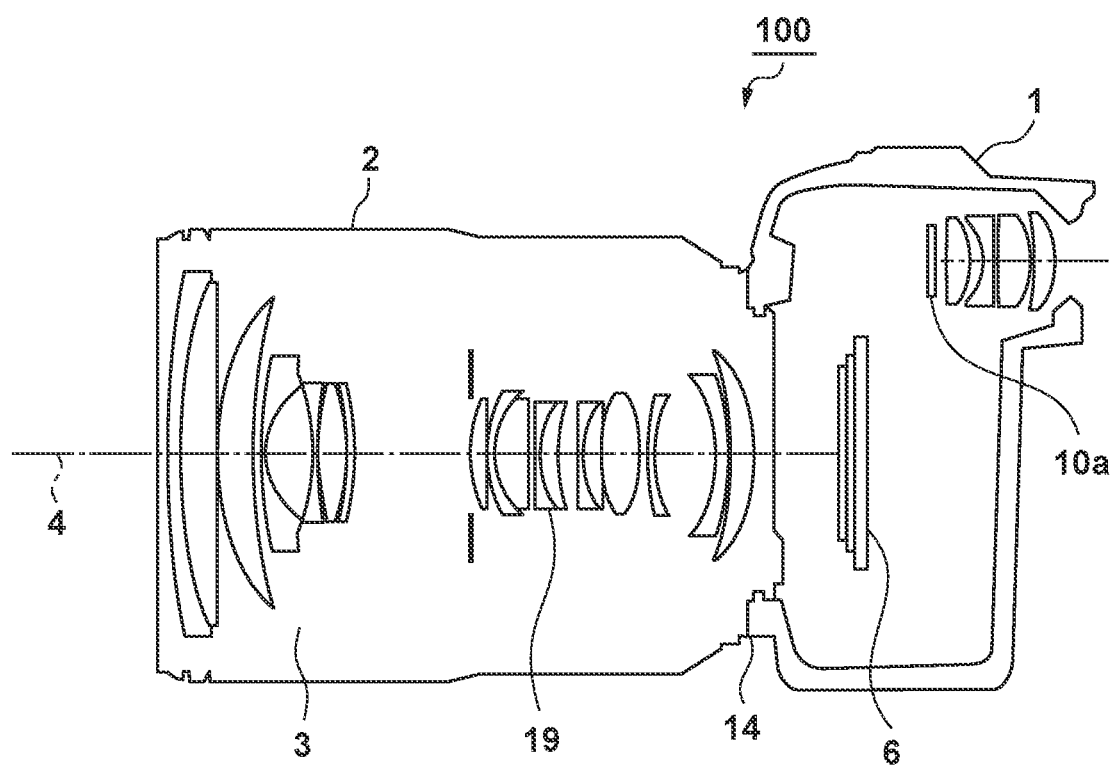
FIG. 1A is a central sectional view of an image capturing system according to an embodiment of the present invention.

Hereinafter, embodiments will be described in detail with reference to the attached drawings. Note, the following embodiments are not intended to limit the scope of the claimed invention, and limitation is not made an invention that requires a combination of all features described in the embodiments. Two or more of the multiple features described in the embodiments may be combined as appropriate. Furthermore, the same reference numerals are given to the same or similar configurations, and redundant description thereof is omitted.

First Embodiment

Figure 1B:
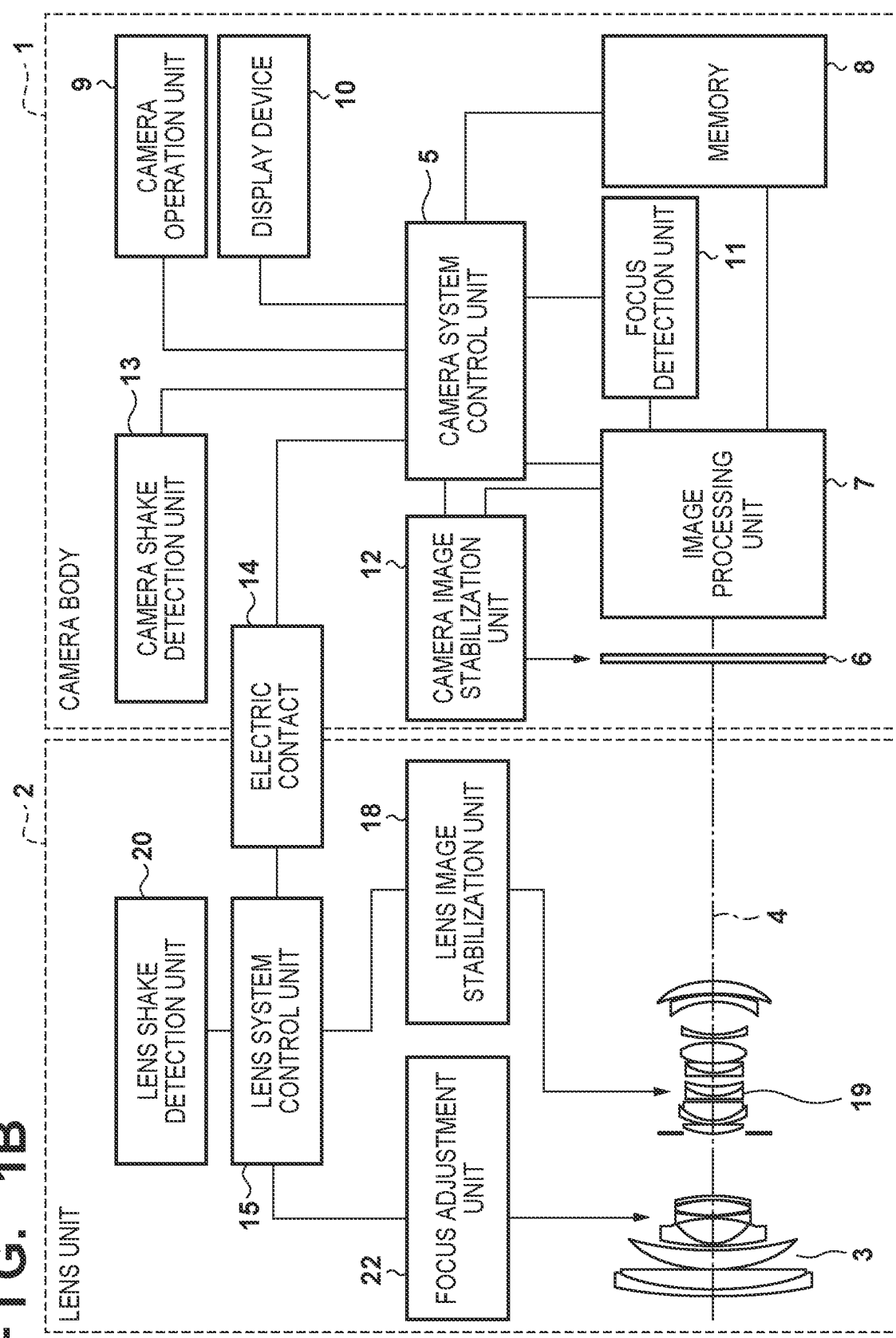
FIG. 1B is a block diagram showing a schematic configuration of the image capturing system according to the embodiment.

FIGS. 1A and 1B are diagrams showing a configuration of an image capturing system 100 including an image stabilization apparatus according to a first embodiment of the present invention. FIG. 1A is a central sectional view of the image capturing system 100, and FIG. 1B is a block diagram showing a schematic configuration of the image capturing system in the present invention.

As shown in FIG. 1A, the image capturing system 100 of the present invention includes a camera body 1 and a lens unit 2 that can be attached to and detached from the camera body 1. The lens unit 2 has an imaging optical system 3 including a plurality of lenses including an image stabilization lens unit 19. A dotted line 4 indicates the optical axis of the imaging optical system 3. The camera body 1 also includes an image sensor 6 and an electronic viewfinder 10a that is also called an EVF and forms a part of a display device 10. The camera body 1 and the lens unit 2 are communicably connected via an electric contact 14.

FIG. 1B is the block diagram showing the schematic configuration of the image capturing system 100. The image capturing system 100 composed of the camera body 1 and the lens unit 2 is roughly divided into an imaging system, an image processing system, a recording/playback system, and a control system. The imaging system includes the imaging optical system 3 and the image sensor 6, and the image processing system includes an image processing unit 7 and a focus detection unit 11. The recording/playback system includes a memory 8 and the display device 10, and the control system includes a camera system control unit 5, a camera operation unit 9, the focus detection unit 11, a lens system control unit 15, a lens image stabilization unit 18, and a focus adjustment unit 22.

In addition to the configuration shown in FIG. 1A, the lens unit 2 further includes the lens system control unit 15, the lens image stabilization unit 18 that drives the image stabilization lens unit 19 to compensate for shake, a lens shake detection unit 20, and the focus adjustment unit 22 for driving the focus lens included in the imaging optical system 3.

In the present embodiment, the lens shake detection unit 20 uses a vibrating gyro that uses Coriolis force, and detects the rotational shake applied to the lens unit 2. The lens shake detection unit 20 detects the shake of the lens unit 2 caused by the shake of the user's hand and outputs the lens shake detection signal indicating the lens shake to the lens system control unit 15. The lens system control unit 15 calculates a shift amount (correction amount) of the image stabilization lens unit 19 for reducing (cancelling) the image shake due to the lens shake by using the lens shake detection signal, and outputs an image stabilization instruction including the shift amount to the lens image stabilization unit 18. The lens image stabilization unit 18 controls the movement of the image stabilization lens unit 19 based on the image stabilization instruction from the lens system control unit 15. Specifically, the image stabilization lens unit 19 is driven by the calculated shift amount by controlling an actuator included in a shift mechanism in accordance with the image stabilization instruction, whereby lens stabilization is performed.

In addition to the image stabilization control described above, the lens system control unit 15 can also drive a focus lens (not shown) via the focus adjustment unit 22 and drive to control an aperture mechanism (not shown), zoom lens, and so forth.

In addition to the configuration shown in FIG. 1A, the camera body 1 further includes the camera system control unit 5, the image processing unit 7, the memory 8, the camera operation unit 9, the display device 10, the focus detection unit 11, a camera image stabilization unit 12, and a camera shake detection unit 13. The display device 10 also includes a rear display device (not shown) and a small display panel (not shown) provided on the upper surface of the camera body 1 for displaying shooting information in addition to the electronic viewfinder 10a.

Figure 2:
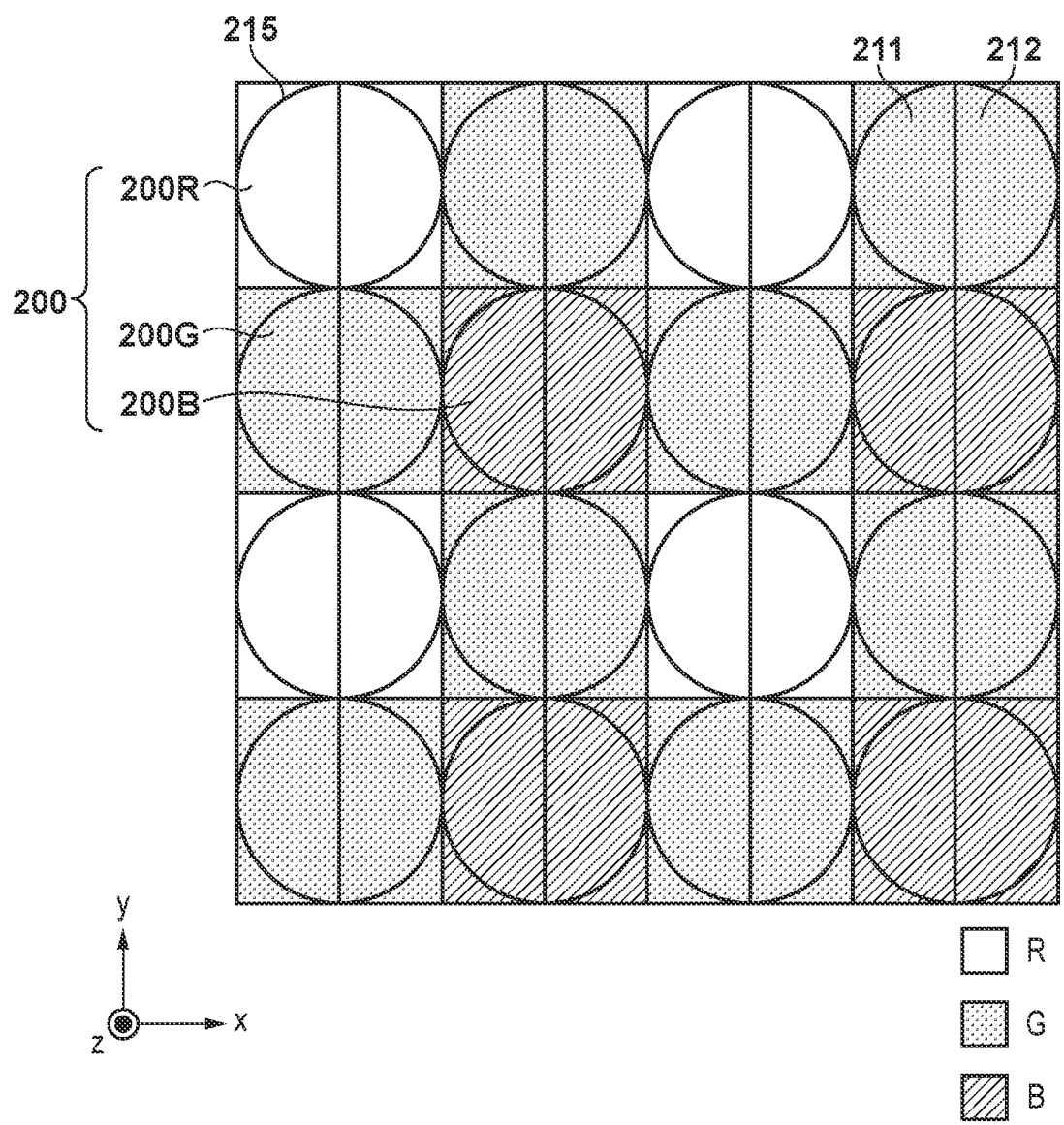
FIG. 2 is a plan view showing an example of an array of pixels according to a first embodiment.

FIG. 2 is a diagram showing an example of a pixel array of the image sensor 6 according to the present embodiment, and 4 columns×4 rows of imaging pixels in the pixel array of the two-dimensional CMOS sensor used as the image sensor 6 is shown.

In this embodiment, it is assumed that each pixel group 200 is composed of pixels of 2 columns×2 rows and is covered with the Bayer array color filter. In each pixel group 200, a pixel 200R having the spectral sensitivity of R (red) is arranged at the upper left position, pixels 200G having the spectral sensitivity of G (green) are arranged at the upper right and lower left positions, and a pixel 200B having the spectral sensitivity of B (blue) is arranged at the lower right position. Further, in the image sensor 6 of the present embodiment, each pixel has a plurality of photodiodes (photoelectric conversion units) with respect to one microlens 215 in order to perform on-imaging plane phase difference focus detection. In the present embodiment, it is assumed that each pixel is composed of two photodiodes 211 and 212 arranged in 2 columns×1 row. Hereinafter, a pixel having such a configuration is referred to as a "focus detection pixel".

The image sensor 6 can acquire image signals and focusing signals by arranging a large number of pixel groups 200 consisting of 2 columns×2 rows of pixels (4 columns×2 rows of photodiodes) shown in FIG. 2 on its imaging surface.

In each focus detection pixel having such a configuration, light fluxes that have passed through different pupil regions are separated by the microlens 215 and enter the photodiodes 211 and 212. Then, the signal (A+B signal) obtained by adding the signals from the two photodiodes 211 and 212 is used as an image signal, and the two signals (A signal and B signal) individually read out from the photodiodes 211 and 212 are used as a focus detection signal pair. It should be noted that the image signal and the focus detection signals may be read out respectively, but in consideration of the processing load, the following may be performed. That is, the image signal (A+B signal) and the focus detection signal (for example, A signal) of one of the photodiodes 211 and 212 are read out, and the difference is taken to obtain the other focus detection signal (for example, B signal) having parallax.

Then, by collecting the plurality of A signals and the plurality of B signals outputted from the plurality of pixels, respectively, a pair of focusing signals (A focusing signal and B focusing signal) used in the on-imaging plane phase difference AF is obtained. Then, the pair of focusing signals are overlapped with each other while shifting the relative positions thereof, and at each shifted position, a correlation calculation of obtaining, for example, the area (correlation amount) of the difference portion of the waveforms is performed. The shifted position where this correlation amount is the smallest, that is, the phase difference (hereinafter referred to as "image shift amount") corresponding to the shift amount with which the correlation is the highest is obtained, and a defocus amount and the defocus direction of the imaging optical system is calculated from the calculated image shift amount.

By using the image sensor 6 having the structure as described above, it is possible to perform live view shooting by the image sensor 6 of receiving light and providing a subject image that can be observed in real time, as well as to perform phase difference focus detection without using a mechanism for splitting light from a subject.

The image sensor 6 having the above configuration converts light from a subject incident through the imaging optical system 3 into an electric signal by photoelectric conversion and outputs the electric signal, which is input to the image processing unit 7.

The image processing unit 7 has an A/D converter, a white balance adjustment circuit, a gamma correction circuit, an interpolation calculation circuit, and the like inside, and can generate an image for recording. A color interpolation processing circuit is also provided in the image processing unit 7, and performs color interpolation (demosaicing) processing on Bayer arrayed signals to generate a color image. Further, the image processing unit 7 compresses images, moving images, sounds, etc. using predetermined methods. The image processing unit 7 performs not only such processing for imaging but also so-called focus detection processing by processing pixel signals from focus detection pixels in cooperation with the focus detection unit 11 between shootings of images.

The focus detection unit 11 cooperates with the image processing unit 7 to detect the phase difference between the optical images based on the output from the focus detection pixels included in the image sensor 6, and convert the phase difference into a defocus amount by a known method. The camera system control unit 5 sends focus adjustment information to the lens system control unit 15 based on the defocus amount outputted from the focus detection unit 11, and the lens system control unit 15 drives the focus lens in the direction of the optical axis 4 via the focus adjustment unit 22.

Further, the camera system control unit 5 obtains an appropriate exposure amount by performing a predetermined arithmetic computation using the image data obtained by the image processing unit 7, and controls the aperture included in the imaging optical system 3 and the exposure time of the image sensor 6 based on the exposure amount. By appropriately adjusting the imaging optical system 3, the image sensor 6 is exposed with an appropriate amount of light from the subject, and the subject image is formed in the vicinity of the image sensor 6.

In the present embodiment, the camera shake detection unit 13 uses a vibrating gyro that utilizes the Coriolis force, and detects rotational shake applied to the camera body 1. The camera shake detection unit 13 detects a shake of the camera body 1 (hereinafter, referred to as "camera shake") caused by a user's hand shake or the like, and outputs a camera shake detection signal indicating the camera shake to the camera system control unit 5. The camera system control unit 5 calculates a shift amount (correction amount) of the image sensor 6 for reducing (cancelling) image blur due to the camera shake using the camera shake detection signal, and issues an image stabilization instruction including the shift amount to the camera image stabilization unit 12. The camera image stabilization unit 12 controls an actuator included in the shift mechanism in accordance with the image stabilization instruction from the camera system control unit 5 to shift the image sensor 6 by the shift amount in the plane orthogonal to the optical axis 4. As a result, sensor image stabilization is performed.

Further, in addition to the image stabilization control, the camera image stabilization unit 12 performs periodic drive control on the image sensor 6 so as to reduce the influence of moire caused by the spatial aliasing of the high spatial frequency components of the subject image under control of the camera system control unit 5. This realizes the function as a vibration type low-pass filter in the present embodiment.

Next, the periodic drive control of the vibration type low-pass filter in the present embodiment will be described. In this embodiment, the camera image stabilization unit 12 performs the periodic drive control shown in FIG. 3 on the image sensor 6.

Figure 3:
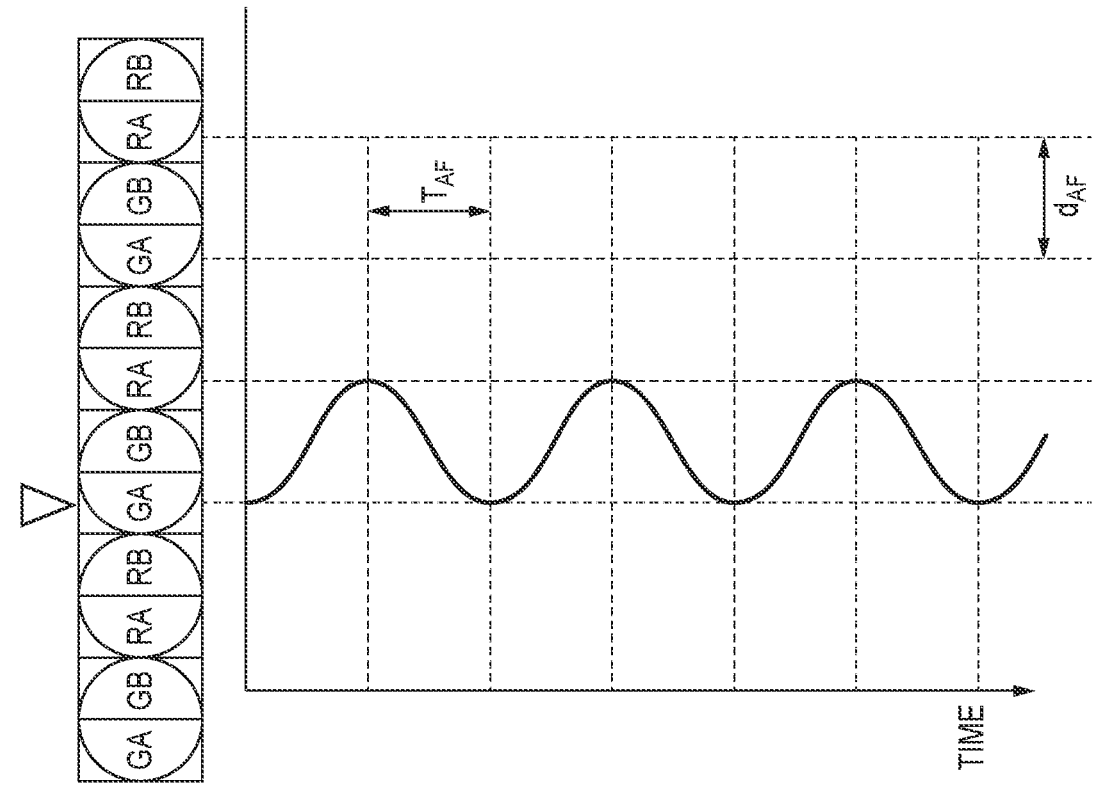
FIG. 3 is a schematic diagram showing an example of periodic drive control of a vibration type low-pass filter according to the first embodiment.

FIG. 3 is a diagram illustrating a driving method of the image sensor 6 for realizing the optical low-pass filter effect in the present embodiment. In the upper part of FIG. 3, among the pixels forming the image sensor 6, a part of the R (red)/G (green) row of the Bayer array is shown. In addition, for simplification of description, a case of shifting the image sensor 6 in the horizontal direction is shown. The region corresponding to the photodiode on the left side of the pixel is referred to as an A region for convenience, the region corresponding to the photodiode on the right side of the pixel is referred to as a B region for convenience, and the A regions of the R and G pixels are shown as RA and GA, respectively, and the B regions of the R and G pixels are shown as RB and GB, respectively.

The lower part of FIG. 3 shows the change over time of the position of the GA pixel indicated by ∇, where the vertical axis represents the lapse of time downward, and the horizontal axis represents the position. The dotted lines in the direction of time indicate the vertical synchronization period, that is, the focus detection cycle $T_{AF}$, and the focus detection processing is performed once in the period of this focus detection cycle $T_{AF}$. Further, the dotted lines in the position direction show the distance $d_{AF}$ between the focus detection pixels. The change in the position of the GA pixel shown in FIG. 3 can be realized by moving the image sensor 6 in the horizontal direction.

As described above, by moving the image sensor 6 in the direction in which the phase difference is to be detected by the distance $d_{AF}$ between the focus detection pixels in the focus detection cycle $T_{AF}$, it is possible to substantially block the frequency band higher than the Nyquist frequency. Accordingly, it is possible to prevent erroneous detection of the focus state.

In addition, since the image sensor 6 is reciprocally driven using two cycles of the focus detection cycle $T_{AF}$, it is possible to suppress the generation of unnecessary sound and vibration, and to cope with a higher frame rate. Further, it is possible to prevent unnecessary increase in power consumption.

In the present embodiment, the case where the camera image stabilization unit 12 performs the shift drive control of the image sensor 6 has been described, but the present invention is not limited to this, and the lens image stabilization unit 18 may perform the shift drive control by driving the image stabilization lens unit 19. In other words, any configuration can be used as long as the incident position of the light flux on the image sensor 6 can be shifted.

Further, in the present embodiment, the situation that the camera image stabilization unit 12 performs only the periodic drive control has been described, but the same effect can be achieved by additionally performing a known image stabilization operation for correcting camera shake applied to the camera.

<First Modification>

Figure 4:
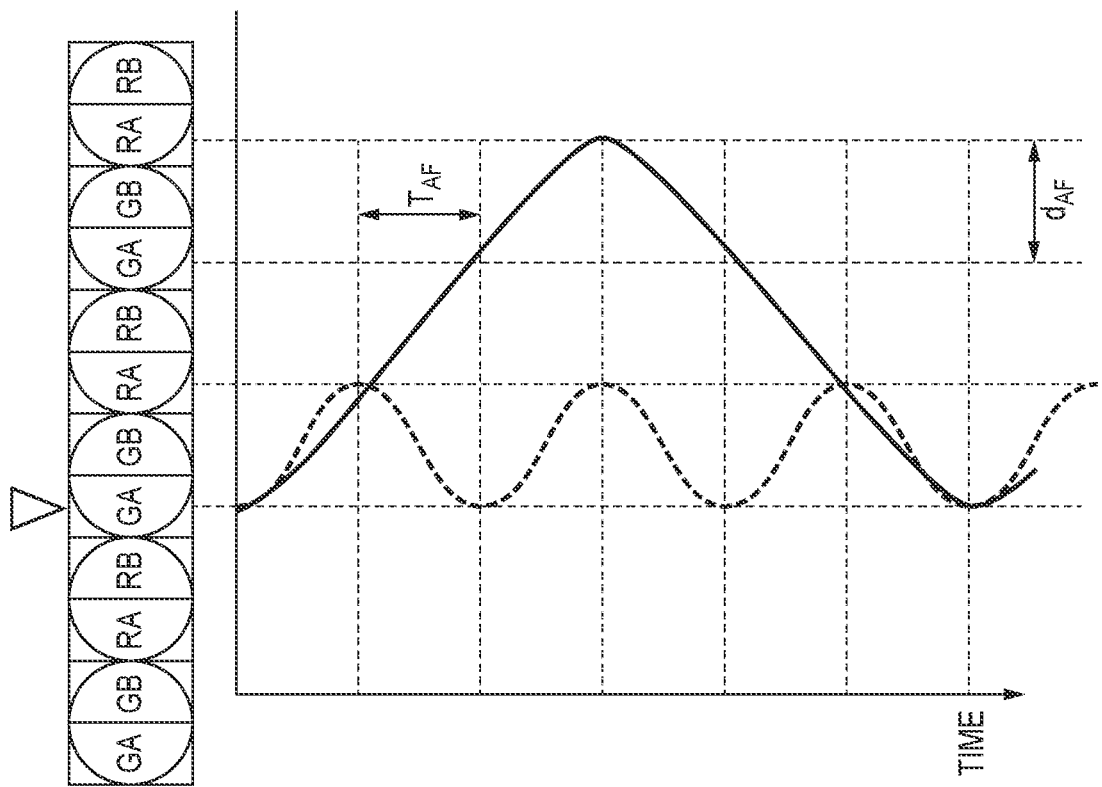
FIG. 4 is a schematic diagram showing an example of periodic drive control of the vibration type low-pass filter according to a first modification of the first embodiment.

FIG. 4 shows another example of shift drive control when the image sensor 6 is used as the vibration type low-pass filter.

Note that, in FIG. 4, GA, GB, RA, RB, the vertical axis and the horizontal axis are the same as those in FIG. 3, thus the description thereof is omitted. In FIG. 4, a solid line shows the drive control performed by the camera image stabilization unit 12 in the first modification. The bold dotted line is the drive control shown in FIG. 3, and is shown for comparative reference.

As shown by the solid line in FIG. 4, in the periodic drive control by the camera image stabilization unit 12, the image sensor 6 is moved with an amplitude larger than the periodic drive control (bold dotted line) shown in FIG. 3, by the distance $d_{AF}$ which is about the distance between the focus detection pixels per one focus detection cycle $T_{AF}$ in the direction that the focus detection pixels are arrayed (left and right direction in FIG. 4).

Figure 8:
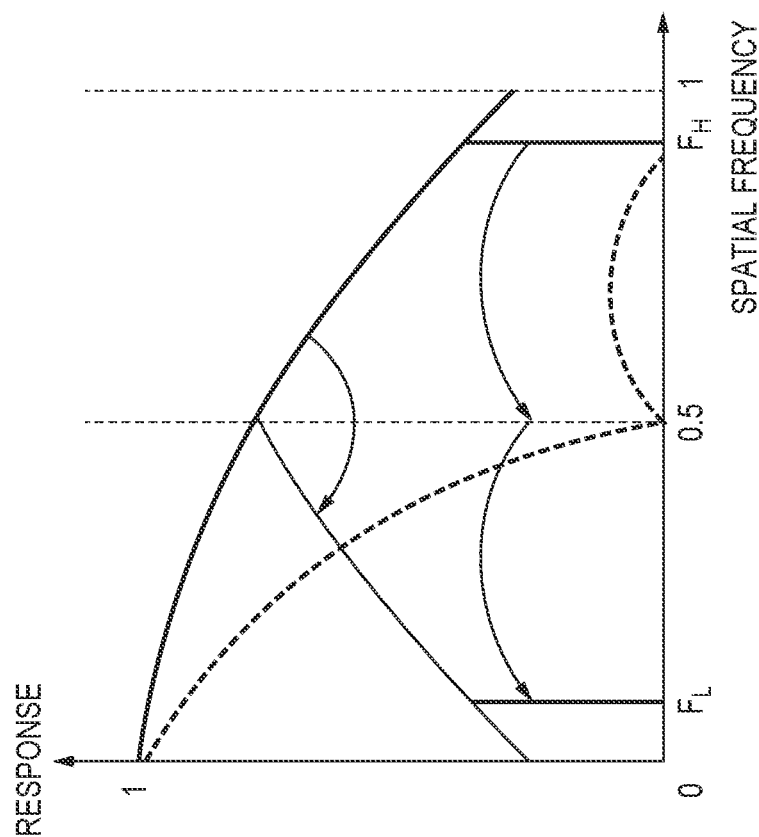
FIG. 8 is a schematic diagram showing response characteristics of a conventional image sensor with respect to spatial frequency.

In the example shown in FIG. 4, the image sensor 6 is controlled to move by the distance $d_{AF}$ which is about the distance between the focus detection pixels per one focus detection cycle $T_{AF}$ in the direction that the focus detection pixels are arrayed. However, in reality, the charge accumulation period for focus detection should be considered. That is, the drive control as shown in FIG. 4 shows a condition that one focus detection cycle $T_{AF}$ is equivalent to a charge accumulation period τ for focus detection, and the driving frequency needs to be set higher under the condition of $\tau < T_{AF}$. By performing the periodic drive control under the conditions as described above, it is possible to suppress vibrations and sounds that may occur in the periodic drive control as shown in FIG. 3, and to cope with a case where the focus detection cycle $T_{AF}$ is shortened due to an increase in the frame rate. Further, the same effect as that of the optical low-pass filter shown in FIG. 8 can be obtained in each frame of a live view image.

By performing the periodic drive control shown in FIG. 4, a shift by the distance ($= 3 \times d_{AF}$) corresponding to the three focus detection pixels (an integer multiple of distance between the focus detection pixels, the integer being 1 or greater) occurs in the acquired images during the three focus detection cycles. However, during the focus detection period, that is, during a period displaying a live view image, the image sensor 6 performs the process of adding three pixels of the same color in the horizontal direction at the time of reading pixel signals, and thus the effect of the periodic driving does not appear in the live view image. Therefore, it is not necessary to perform additional processing such as changing the display position of the live view image in the display device 10 such as the electronic viewfinder 10a. In addition, since the image sensor 6 is reciprocally driven with an amplitude of $3 \times d_{AF}$ using six cycles of the focus detection cycle $T_{AF}$, the driving speed in one reciprocal movement is the same as that shown in FIG. 3, and an driving amount in the phase difference detection direction during the charge accumulation period for focus detection equals to the distance between the focus detection pixels.

Here, let the speed of the image sensor 6 driven with the periodic drive control shown in FIG. 4 be defined as the first speed, depending on the weight of the movable part of the camera image stabilization unit 12, there may be a case where power consumption is too large even if the image sensor is driven at the first speed and a case where the driving at the first speed cannot be realized. In such cases, the maximum speed (referred to as "second speed") that can be realized with the weight of the movable portion is determined in advance, and in a case where the first speed is higher than the second speed, the drive control is performed at the second speed or lower.

<Second Modification>

Figure 5:
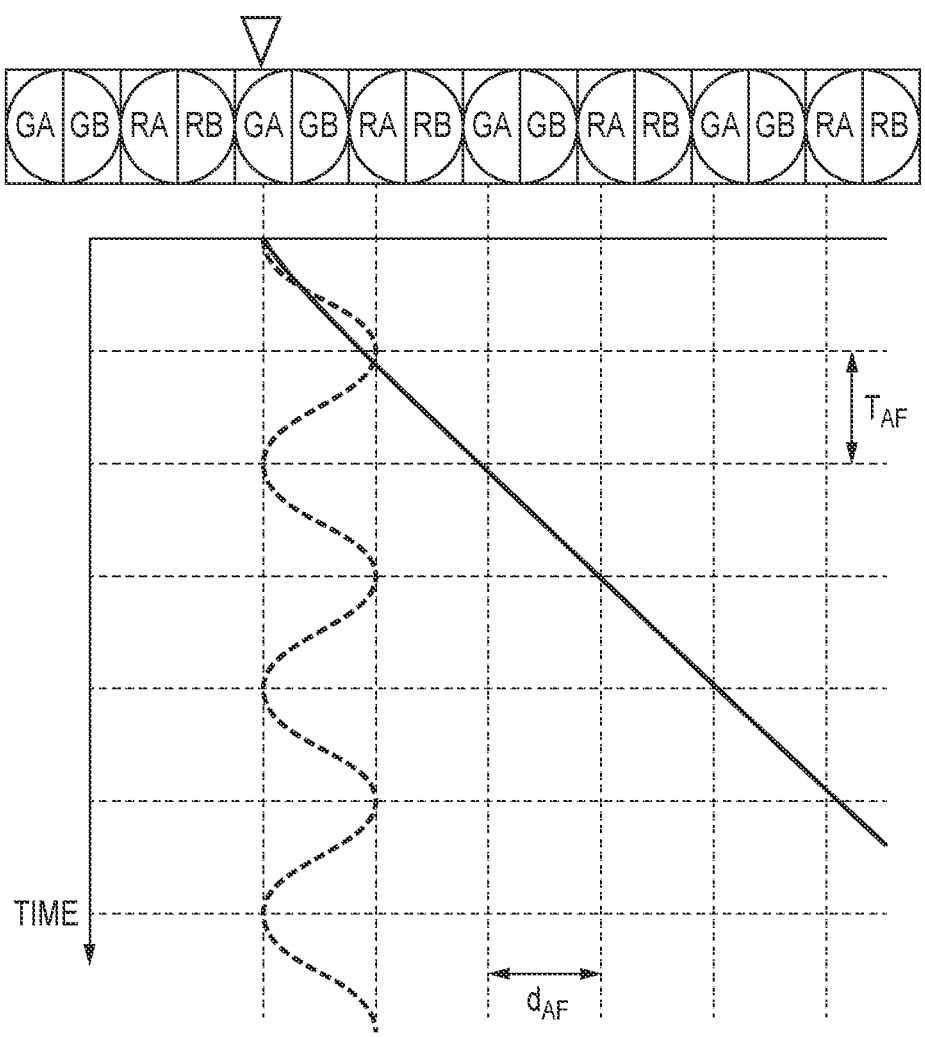
FIG. 5 is a schematic diagram showing an example of periodic drive control of the vibration type low-pass filter according to a second modification of the first embodiment.

FIG. 5 shows another example of shift drive control when the image sensor 6 is used as a vibration type low-pass filter.

The periodic drive control shown in FIG. 5 is characterized in that the period is longer than that shown in FIG. 4. In the case of the periodic drive control as shown in FIG. 5, the distance that the image sensor 6 moves per the focus detection cycle $T_{AF}$ is the distance $d_{AF}$ between the focus detection pixels as in FIG. 4, and thus the same effect as that of an optical low-pass filter is obtained. On the other hand, since the amplitude of the periodic drive control is larger than that in FIG. 4, a live view image displayed on the display device 10 such as the electronic viewfinder 10a will gradually move. Therefore, the camera system control unit 5 performs display control of moving the display position of the live view image in the direction opposite to the direction of the periodic drive control so that the display position on the display device 10 will not move.

According to the first and second modifications described above, it is possible to suppress the generation of unnecessary sounds and vibrations, cope with a higher frame rate, and prevent an increase in unnecessary power consumption.

In FIGS. 4 and 5 described in the first and second modifications, the periodic drive controls make the image sensor start moving in the same direction (to the light in the graph). Regarding this direction, it is advantageous to change it in accordance with the deviation of position of the image sensor 6 or the image stabilization lens unit 19 caused by the additionally performed image stabilization as described above. For example, if the position of the image sensor 6 has been already shifted to the right in FIG. 4 by the camera image stabilization unit 12, the periodic drive control make the image sensor 6 start moving to the left. By controlling the driving direction in this way, the center position of the amplitude of the periodic movement of the image sensor 6 can be kept as close to the optical axis 4 as possible, and the drivable range of the image sensor 6 can be used in a well-balanced manner.

Further, in FIGS. 3 to 5, the distance that the image sensor 6 moves within the focus detection cycle $T_{AF}$ equals to the distance $d_{AF}$ between the focus detection pixels, but the present invention is not limited to this. For example, drive control may be performed so that the imaging device moves by an appropriate distance according to the spatial frequency at which spatial aliasing is desired to be suppressed. For example, when the distance is set to a value smaller than $d_{AF}$, the solid line in FIG. 8 becomes 0 at frequencies higher than the Nyquist frequency. In this case, the response obtained at frequencies above the Nyquist frequency is folded back in the region below the Nyquist frequency, but if it does not affect the spatial frequency band where focus detection is desired, it will not affect focus detection itself and there will be no problem. In any case, the distance that the image sensor 6 moves within the focus detection cycle $T_{AF}$ can be considered to be a value defined based on the distance $d_{AF}$ between the focus detection pixels (the distance between the focus detection pixels or less).

Further, FIGS. 3 to 5 are described on the premise that the focus detection pixels receive the light fluxes passing through the areas A and B of the exit pupil, however, the configuration of the image sensor 6 of the present invention is not limited to that shown in FIG. 2. Any configuration is acceptable as long as the image sensor 6 includes focus detection pixels that output signals from which focus detection signal pairs having parallax can be acquired based on light from a subject that has passed through different pupil regions of the imaging optical system.

For example, the focus detection pixels may be arranged in a direction orthogonal to the arrangement direction of the A region and the B region (vertical direction in FIGS. 4 and 5). In this case, the direction of the periodic drive control also has to be in a direction orthogonal to the drive direction in FIGS. 4 and 5. Further, in the case where four square-shaped focus detection pixels are arranged in one imaging pixel, by setting the direction of the periodic drive control to a diagonal direction of 45 degrees, it is possible to obtain the same effect as that in the above-described embodiment.

<Third Modification>

In the image capturing system 100 of the first embodiment, all the photoelectric conversion units of the imaging pixels are formed as focus detection pixels, but the present invention is not limited to this, and the focus detection pixels may be arranged discretely. In this case, the distance between the focus detection pixels is different from the distance between the imaging pixels. The control in this case will be described with reference to FIGS. 6 and 7.

Figure 6:
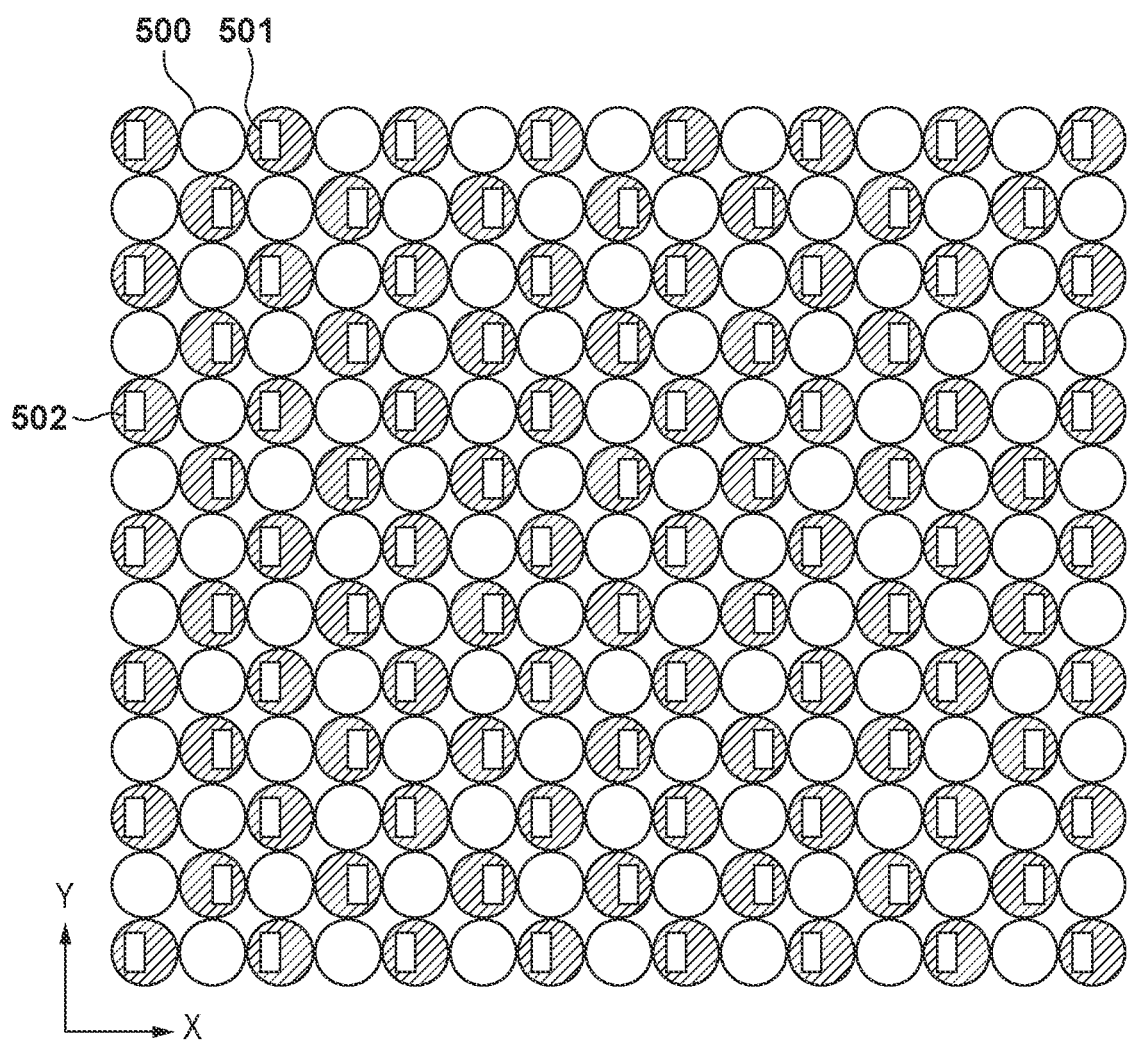
FIG. 6 is a plan view showing an example of an array of pixels using masks according to a third modification of the first embodiment.

FIG. 6 shows another example of the pixel array of the image sensor 6. In FIG. 6, reference numeral 500 denotes an imaging pixel for forming an image, and 501 and 502 denote focus detection pixels over which light-shielding structures are arranged using, for example, a technology disclosed in Japanese Patent Laid-Open No. 2009-244862, or the like. The first focus detection pixel 501 and the second focus detection pixel 502 form a pair, and output a focus detection signal pair used for on-imaging plane phase difference focus detection. This focus detection signal pair is suitable for detecting the focus position of a subject having a vertical stripe pattern in the y direction. Similarly, focus detection pixel pair having different light-shielding structures in the vertical direction may be provided. In that case, the focus detection signal pair is suitable for detecting the focus position of a subject having a horizontal stripe pattern in the x direction.

Figure 7:
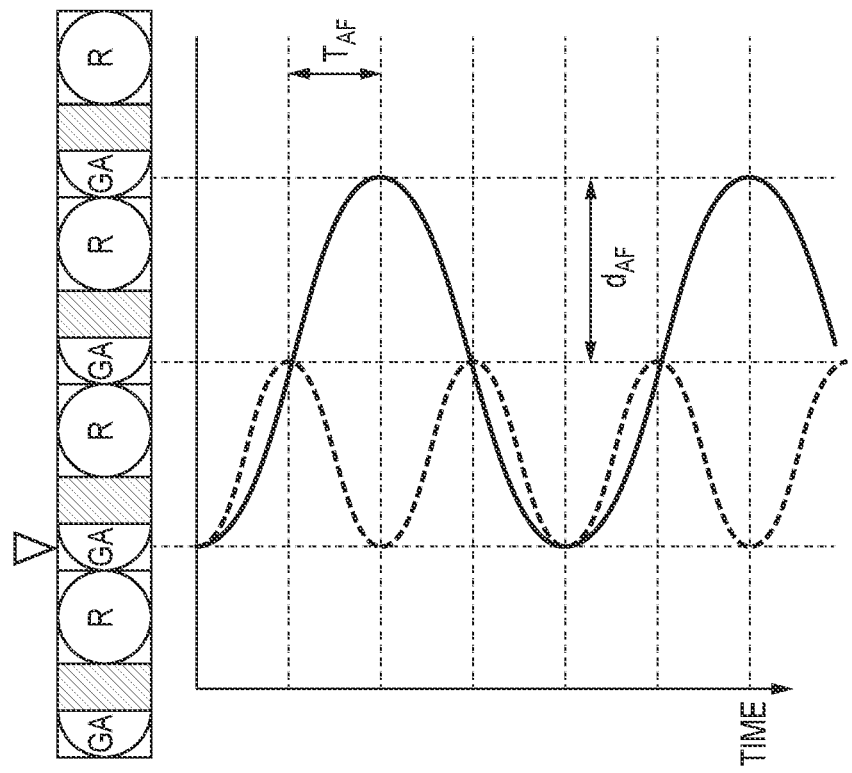
FIG. 7 is a schematic diagram showing an example of periodic drive control of the vibration type low-pass filter according to the third modification of the first embodiment.

FIG. 7 is a schematic diagram for explaining periodic drive control of the image sensor 6 in a case where the focus detection pixels are discretely arranged. Note that FIG. 7 illustrates only the pixels that receive the light flux passing through one of the exit pupil regions in order to describe the relationship between the pixel arrangement and the speed driven by the camera image stabilization unit 12.

In the case of the example shown in FIG. 7, the focus detection pixels are arranged at the same color (G) pixel positions, and therefore, they are arranged at an interval of two pixels in terms of imaging pixels. In order to obtain a response as shown by the solid line in FIG. 8 even with such an arrangement, it is necessary to drive the image sensor 6 by the distance $d_{AF}$ between the focus detection pixels discretely arranged. A bold dotted line in the FIG. 7 indicates the periodic driving in a case where the periodic driving is performed with the concept shown in FIG. 3 with respect to the discretely arranged focus detection pixels. As will be understood from FIG. 7, a higher-speed reciprocating operation is required compared to the operation performed for the image sensor 6 in which the focus detection pixels are arranged next to each other as shown in FIGS. 4 and 5. Accordingly, the periodic driving as shown by the solid line is performed. That is, in the case where focus detection pixels are discretely arranged, the periodic drive control is performed with a larger amplitude than that in the first embodiment.

By performing the periodic drive control with a large amplitude in this way, even when the focus detection pixels are discretely arranged, the same effect as that of the above-described embodiment can be obtained.

Second Embodiment

Next, a second embodiment of the present invention will be described. Note that the configuration of the image capturing system 100 according to the second embodiment is the same as that described with reference to FIGS. 1A and 1B, and description thereof will be omitted here. However, the image sensor 6 in the second embodiment does not have a focus detection pixel group, unlike the configuration described in the first embodiment. Instead, in the second embodiment, the image capturing system 100 performs so-called contrast AF. That is, the focus detection unit 11 acquires contrast information of the pixel signals obtained from the image sensor 6 while changing the focus state of the imaging optical system 3, and detects the position of the focus lens at the time when the contrast becomes maximum. Then, the focus lens is driven and controlled by the focus adjustment unit 22 via the camera system control unit 5 and the lens system control unit 15 so as to be at the detected position. Note, since a pixel signal (image signal) used for acquiring the contrast information by the focus detection unit 11 of the present invention is a signal used for focus detection, it is called "focus detection signal" hereinafter.

Even in the case of the contrast AF method, since a subject having a high spatial frequency is sampled by the imaging pixels, an spatial aliasing phenomenon occurs with the Nyquist frequency as a boundary. For this reason, when the focus lens reaches around the in-focus position while changing the focus state, it may be erroneously determined that the contrast is lowered due to the influence of the low-frequency signal. In this case, too, the periodic drive control carried out in the first embodiment, the first or second modification is effective. At this time, the direction of the periodic driving has to be the direction for detecting the contrast.

In general, contrast is often detected in the readout direction of the image sensor 6, and in that case, drive control of performing periodic driving in the readout direction is performed. However, depending on the type of subject, the contrast may be detected in the direction orthogonal to the readout direction, and in that case, drive control of performing periodic driving in the direction in which the contrast is to be detected is performed.

Further, a live view image used for focus detection is subjected to the same color addition processing in the readout direction and the downsampling processing such as the thinning processing in the direction orthogonal to the readout direction. For this reason, particularly in focus detection in the direction orthogonal to the readout direction in which the thinning processing is performed, the interval between pixels used for focus detection is wide, and it is necessary to perform periodic drive control based on that interval. This periodic drive control is the same as the drive control shown in FIG. 7 of third modification of the first embodiment.

Regarding the readout direction in which the same color addition processing is performed, it is conceivable that the drive control similarly to that shown in any one of FIG. 3 to FIG. 5 is performed so that the spatial aliasing phenomenon does not occur in the image signal before the addition, and the drive control similarly to that shown in FIG. 7 is performed so as to suppress the spatial aliasing in the image signal after the addition. This drive control may be determined according to the spatial frequency of the subject that is important in focus detection and to the extraction (filtering) process for the specific band performed for extracting the important spatial frequency. In addition to this direction control of the periodic driving, control of the drive frequency, the drive direction at the time of starting the driving, and the display position associated with the periodic driving, and additional driving for image stabilization, etc. are performed. These control and driving are the same as those described in the first embodiment, and the explanation thereof is omitted.

As described above, according to the second embodiment, it is possible to obtain the same effect as that of the above-described embodiment even in the image capturing apparatus that performs the contrast AF.

In addition, in the above-described first and second embodiments, the description has been made using the interchangeable lens type digital camera (so-called single-lens camera), but the present invention is not limited to this, and is applicable to a lens fixed type digital camera (so-called compact digital camera).

Further, although it is not particularly mentioned whether the focus detection operation is for a still image or a moving image, the present invention is not limited by this, and in a case where a subject with high frequency exists, the periodic drive control may be carried out during an operation before the still image shooting or during the focus detection during the moving image shooting.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-197648, filed on Oct. 30, 2019 which is hereby incorporated by reference herein in its entirety.

What is claimed is:

1. An image capturing apparatus comprising:
an image sensor in which a plurality of pixels are arranged, wherein the plurality of pixels output focus detection signals based on light flux that has passed through an imaging optical system;
a shifting control unit that controls to shift an incident position of the light flux on the image sensor; and
a focus detection unit that performs focus detection using the focus detection signals,
wherein the shifting control unit controls to perform periodic drive of shifting the incident position by a predetermined distance which is equal to or less than a distance between the pixels of the image sensor corresponding to the focus detection signals in a predetermined direction during a charge accumulation period in the image sensor for acquiring the focus detection signals, wherein the periodic drive is to shift the incident position so that the incident position at an end of the charge accumulation period differs from the incident position at a start of the charge accumulation period by the predetermined distance, and that the distance from the shifted incident position to the incident position at the start of the charge accumulation period remains within the predetermined distance for the entire charge accumulation period for which the focus detection is performed once, and wherein each unit is implemented by one or more processors, circuitry or a combination thereof.

2. The image capturing apparatus according to claim 1, wherein the shift control unit moves the image sensor in a plane orthogonal to an optical axis of the imaging optical system.

3. The image capturing apparatus according to claim 1, wherein the shifting control unit moves an image stabilization lens included in the imaging optical system in a plane orthogonal to an optical axis of the imaging optical system.

4. The image capturing apparatus according to claim 1, wherein the shifting control unit controls to shift the incident position of the light flux so that the incident position reciprocates on the image sensor.

5. The image capturing apparatus according to claim 4, wherein an amplitude of the reciprocation is an integer multiple of the distance between the pixels of the image sensor corresponding to the focus detection signals.

6. The image capturing apparatus according to claim 1, wherein the pixels include focus detection pixels from which a pair of focus detection signals having parallax in the predetermined direction can be obtained based on a light flux passing though different pupil regions of the imaging optical system, wherein the focus detection unit performs phase difference focus detection using the pair of focus detection signals output from the focus detection pixels, and wherein the difference between the pixels of the image sensor corresponding to the focus detection signals corresponding to the difference between the focus detection pixels.

7. The image capturing apparatus according to claim 6, wherein each of the focus detection pixels of the image sensor includes a microlens and a plurality of photoelectric conversion portions.

8. The image capturing apparatus according to claim 6, wherein the image sensor has a configuration in which a plurality of first focus detection pixels whose first portions are shielded from light and a plurality of second focus detection pixels whose second portions different from the first portions are shielded from light are discretely arranged in the plurality of pixels.

9. The image capturing apparatus according to claim 1, wherein the focus detection signals are image signals, the focus detection unit performs focus detection based on contrast of the image signals, and the distance between the pixels of the image sensor corresponding to the focus detection signal is the distance between the pixels of the image sensor corresponding to the image signals read out from the plurality of pixels for acquiring an image to be used for the focus detection.

10. The image capturing apparatus according to claim 1, wherein a maximum speed of the shift of the incident position of the light flux is determined by a weight of a member for shifting the incident position of the light flux.

11. The image capturing apparatus according to claim 1 further comprising:

a detection unit that detects shake; and a calculation unit that calculates a correction amount for shifting the incident position of the light flux on the image sensor so as to cancel the shake detected by the detection unit, wherein the shifting control unit controls to shift the incident position of the light flux based on a value obtained by adding the correction amount to the predetermined distance and wherein each unit is implemented by one or more processors, circuitry or a combination thereof.

12. The image capturing apparatus according to claim 11, wherein the direction of the shift of the predetermined distance controlled by the shifting control unit is opposite to the direction of deviation of the incident position of the light flux determined based on the correction amount calculated by the calculation unit.

13. The image capturing apparatus according to claim 1 further comprising a display control unit that controls to display an image on a display device based on a signal obtained from the image sensor, wherein the display control unit performs display control by moving a display position of the image in a direction in which it is possible to cancel a shift of a subject image on the image sensor caused by shifting the incident position of the light flux, and wherein the display control unit is implemented by one or more processors, circuitry or a combination thereof.

14. The image capturing apparatus according to claim 1 further comprising the imaging optical system.

15. The image capturing apparatus according to claim 1, wherein the imaging optical system is detachable from the image capturing apparatus.

16. The image capturing apparatus according to claim 1, wherein a period of the periodic drive in the predetermined direction is twice or more of the charge accumulation period.

17. A control method of an image capturing apparatus which comprises an image sensor in which a plurality of pixels are arranged, wherein the plurality of pixels output focus detection signals based on light flux that has passed through an imaging optical system, a shifting control unit that controls to shift an incident position of the light flux on the image sensor, and a focus detection unit that performs focus detection using the focus detection signals wherein the shifting control unit control to perform periodic drive of shifting the incident position by a predetermined distance which is equal to or less than a distance between the pixels of the image sensor corresponding to the focus detection signals in a predetermined direction during a charge accumulation period in the image sensor for acquiring the signals, and wherein the periodic drive is to shift the incident position so that the incident position at an end of the charge accumulation period differs from the incident position at a start of the charge accumulation period by the predetermined distance, and that the distance from the shifted incident position to the incident position at the start of the charge accumulation period remains within the predetermined distance for the entire charge accumulation period for which the focus detection is performed once.

\* \* \* \* \*